(12) United States Patent
Bulin et al.

(10) Patent No.: US 9,821,918 B2
(45) Date of Patent: Nov. 21, 2017

(54) AIRCRAFT COMPRISING A CONTROL DEVICE FOR A JET PIPE NOZZLE WITH VARIABLE CROSS-SECTION POWERED BY TWO INDEPENDENT ELECTRICAL POWER SUPPLIES

(71) Applicant: Airbus Operations (S.A.S.), Toulouse (FR)

(72) Inventors: Guillaume Bulin, Blagnac (FR); Pierre Calvairac, Fonsorbes (FR); Nicolas Lecointre, Toulouse (FR); Paul-Emile Roux, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 590 days.

(21) Appl. No.: 14/480,016

(22) Filed: Sep. 8, 2014

(65) Prior Publication Data
US 2015/0266588 A1    Sep. 24, 2015

(30) Foreign Application Priority Data
Sep. 10, 2013   (FR) ...................................... 13 58695

(51) Int. Cl.
*B64D 33/04*   (2006.01)
*F02K 1/09*    (2006.01)
(Continued)

(52) U.S. Cl.
CPC ............ *B64D 33/04* (2013.01); *B64D 31/14* (2013.01); *B64D 35/08* (2013.01); *F02K 1/09* (2013.01);
(Continued)

(58) Field of Classification Search
CPC ........ B64D 33/04; B64D 31/14; B64D 35/08; B64D 2221/00; F02K 1/09; F02K 1/15; Y02T 50/677; F05D 2260/84
(Continued)

(56) References Cited

U.S. PATENT DOCUMENTS 3,202,464 A    8/1965   Chaboseau et al.
6,439,504 B1*  8/2002   Ahrendt ................... F02K 1/763
                                                    239/265.19

(Continued)

FOREIGN PATENT DOCUMENTS

EP        779 429     6/1997
EP      1 978 231    10/2008
(Continued)

OTHER PUBLICATIONS

Hoffman et al. "Advanced Secondary Power System for transport Aircraft", May 1985.*
(Continued)

*Primary Examiner* — Assres H Woldemaryam
(74) *Attorney, Agent, or Firm* — Jenkins, Wilson, Taylor & Hunt, P.A.

(57) ABSTRACT

The subject of the disclosure is an aircraft comprising at least one left motor generator, at least one right motor generator, a control device for a jet pipe nozzle with variable cross-section of the aircraft comprising at least one control member powered by a first airplane electrical power supply linked to at least one right or left motor generator, the control member powered by a second electrical power supply linked to an electrical power source of the aircraft independent of the first airplane electrical power supply.

15 Claims, 6 Drawing Sheets

(51) Int. Cl.
*F02K 1/15* (2006.01)
*B64D 31/14* (2006.01)
*B64D 35/08* (2006.01)

(52) U.S. Cl.
CPC ............ *F02K 1/15* (2013.01); *B64D 2221/00* (2013.01); *F05D 2260/84* (2013.01); *Y02T 50/677* (2013.01)

(58) Field of Classification Search
USPC .......................................... 244/53 R, 60, 58
See application file for complete search history.

(56) References Cited

U.S. PATENT DOCUMENTS

| | | | | |
|---|---|---|---|---|
| 8,657,227 | B1* | 2/2014 | Bayliss | H02J 4/00 244/134 D |
| 8,713,911 | B2* | 5/2014 | Kopecek | F02K 1/72 239/265.19 |
| 2006/0260323 | A1* | 11/2006 | Moulebhar | F01D 21/003 60/793 |
| 2011/0192135 | A1* | 8/2011 | McKay | F02K 1/16 60/226.2 |
| 2011/0220759 | A1* | 9/2011 | Stolte | B64D 35/00 244/60 |
| 2012/0259483 | A1* | 10/2012 | Villano | B64C 13/42 701/3 |
| 2014/0333127 | A1* | 11/2014 | Edwards | H02J 4/00 307/9.1 |

FOREIGN PATENT DOCUMENTS

| | | |
|---|---|---|
| EP | 2 360 367 | 8/2011 |
| FR | 13 54199 | 1/1963 |
| WO | WO 90/08893 | 8/1990 |
| WO | WO 99/41146 | 8/1999 |

OTHER PUBLICATIONS

French Search Report for Application Serial No. 1358695 dated Jun. 12, 2014.

* cited by examiner ized as an embodiment illustrated in FIG. 1, a
AIRCRAFT COMPRISING A CONTROL DEVICE FOR A JET PIPE NOZZLE WITH VARIABLE CROSS-SECTION POWERED BY TWO INDEPENDENT ELECTRICAL POWER SUPPLIES

TECHNICAL FIELD

The present disclosure relates to an aircraft comprising a control device for a jet pipe nozzle with variable cross-section and to a method for managing the electrical power supply of a control device for a jet pipe nozzle with variable cross-section of an aircraft.

BACKGROUND

To reduce fuel consumption, some aircrafts have a motor drive with a jet pipe nozzle with variable cross-section. Thus, it is possible to adapt the flow passing through the jet pipe nozzle, by modifying its cross-section, to the external conditions and to the motor operating speed in order to optimize the efficiency of the motor drive.

SUMMARY

According to an embodiment illustrated in FIG. 1, a propulsive assembly of an aircraft comprises a nacelle 10 in which there is arranged, substantially concentrically, a motor drive 12 linked via a strut to the rest of the aircraft.

The nacelle 10 comprises an inner wall delimiting a duct 14 with an air inlet 16 at the front, a first part of the incoming air flow, called primary flow, passing through the motor drive 12 to participate in the combustion, the second part of the air flow, called secondary flow, being driven by a fan 18 and flowing in an annular duct 20 delimited by the inner wall of the nacelle and the outer wall of the motor drive. At the rear, the primary flow escapes via a fixed jet pipe nozzle 22 with a tapered portion whose diameter decreases in the direction of flow of the flows. The secondary flow escapes via an outlet 24 delimited inside by the fixed jet pipe nozzle 22 and outside by a jet pipe nozzle 26 with at least one moving part corresponding to the jet pipe nozzle with variable cross-section 26 provided at the rear end of the nacelle.

According to one embodiment, the jet pipe nozzle with variable cross-section 26 comprises at least one part which can be translated in a direction of displacement parallel to the longitudinal direction of the motor (corresponding to the axis of the motor referenced 28) between two limit positions to a front first position illustrated by unbroken lines in FIG. 1 and a rear position illustrated by broken lines in FIG. 1. In as much as the fixed jet pipe nozzle has a tapered form, it is possible to control the outlet cross-section of the jet pipe nozzle with variable cross-section by adjusting the position thereof in the direction of displacement.

According to an embodiment illustrated in FIG. 2, jet pipe nozzle with variable cross-section 26 comprises moving parts 30 which are displaced by virtue of a mechanical transmission chain 32 driven by a motor 34. Each jet pipe nozzle comprises two moving parts 30, 30', positioned symmetrically relative to a vertical median plane of the jet pipe nozzle. The mechanical transmission chain 32 makes it possible to convert the rotational movement of the output shaft of the motor 34 into a translational movement in the direction of displacement of the moving parts. Thus, there is a first mechanical transmission chain 32 between the motor 34 and the moving part 30 and a second mechanical transmission chain 32' between the motor 34' and the moving part 30'.

FIG. 2 shows a control device for a jet pipe nozzle with variable cross-section according to the prior art.

To control the position of the moving parts 30, 30', the control chain comprises a regulation system 36 for the motor drive called FADEC (Full Authority Digital Engine Control), and a control member 38, called PE (Power Electronics) ensuring the control of the motor 34.

Thus, when the regulation system 36 transmits a signal to the control member 38, the latter orders the rotation of the motor 34 which, via mechanical transmission chains 32, 32', generates the translation of the moving parts 30, 30'. The control member 38 ensures, among other things, the power converter function between an upstream control circuit and a downstream power circuit. According to one embodiment, a control member 38 takes the form of a power electronics comprising numerous electrical components such as inverters or transformers, to ensure the power converter function, and electronic components to provide the regulation intelligence for the electric motors. This regulation intelligence can make it possible to reliably and accurately position the moving parts in different positions and ensure the management of the ends of travel of the moving parts, notably the slowing down of the motors and the stopping thereof.

According to one architecture, a control member 38 is positioned close to the motor 34 that it controls. Thus, the control member 38 is positioned in the nacelle and linked to the motor via cables ensuring the electrical power supply for the motor 34 and its controls. To address the constraints imposed by the certification authorities, the control device comprises numerous redundant elements to enhance the driving reliability in cases where it is not possible to enhance etc. the reliability of the elements themselves.

Thus, for each propulsive assembly, the control device comprises two control members 38 and 38', two motors 34 and 34', one for each control member, each of them being capable of generating the movement of all the moving parts 30.

This solution makes it possible to observe the constraints imposed by the certification authorities.

Concerning the electrical power supply, an aircraft comprises a first main electrical power supply busbar linked to a first electrical core and a second main electrical power supply busbar linked to a second electrical core, each main electrical power supply busbar powering several electrical power supply sub-bars which each power a number of electrical power supply lines.

Thus, the availability of the power supply of an electrical power supply line is very slightly less than the availability of the electrical power supply sub-bar to which it is linked, the availability of the electrical power supply sub-bar being very slightly less than the availability of the main electrical power supply busbar to which it is linked.

Concerning the control device for a jet pipe nozzle with variable cross-section, each control member 38, 38', could be powered by a single electrical power supply 40 linked to an electrical power supply line in the manner of a thrust reversal system.

However, this solution cannot be envisaged because the level of availability of an electrical power supply line is not high enough for the function of the jet pipe nozzle with variable cross-section.

To obtain the level of availability required regarding the electrical power supply, one solution consists in powering the control device for a jet pipe nozzle with variable cross-section by an electrical power supply busbar of the electrical power supply of the airplane and by a generator dedicated to the control device, located in the nacelle.

However, this solution is not satisfactory because it results in an increase in the onboard weight and the bulk constraints in the nacelle.

The present disclosure aims to remedy the drawbacks of the prior art. To this end, the subject of the disclosure is an aircraft comprising a control device for a jet pipe nozzle with variable cross-section of the aircraft comprising at least one control member powered by a first airplane electrical power supply linked to at least one motor generator, the control member being wherein it is powered by a second electrical power supply linked to an electrical power source of the aircraft independent of the first airplane electrical power supply.

Preferably, the control member is powered by a motor generator and by a second electrical power supply independent of the motor generators.

According to a first embodiment, the second electrical power supply is linked to the CSMG generator of the aircraft.

According to a second embodiment, the second electrical power supply is linked to an auxiliary power unit APU of the aircraft.

According a third embodiment, the second electrical power supply is linked to at least one electrical energy accumulator of the aircraft.

Advantageously, the control member comprises a first part making it possible to control and power at least one actuator and a second part making it possible to alternately connect with the first airplane electrical power supply or with the second electrical power supply. Preferably, at least the second part of the control member is positioned on the fuselage of the aircraft.

According to another feature, the control member comprises a set of electrical power contactors making it possible to prevent contact between the two electrical power supplies electrically and mechanically.

According to one embodiment, a control device comprises, in a first propulsive assembly, a first control member dedicated to the control of a first jet pipe nozzle with variable cross-section and powered by a first airplane electrical power supply linked indirectly to the left (respectively right) motor generator and, in a second propulsive assembly, a second control member dedicated to the control of a second jet pipe nozzle with variable cross-section and powered by a second airplane electrical power supply linked indirectly to the right (respectively left) motor generator.

In this case, the two control members are preferably powered by the same second electrical power supply and the control device comprises a bypass box with a first input linked to the second electrical power supply and outputs each linked to a control member.

According to another feature, the control device comprises, for each electrical power supply, a circuit breaker to isolate the electrical power supply from the control member.

The disclosure also proposes a method for managing the electrical power supply of a control device for a jet pipe nozzle with variable cross-section of an aircraft, wherein it consists in powering the control member by a second electrical power supply linked to an electrical power source of the aircraft independent of the first airplane electrical power supply when the first airplane electrical power supply no longer powers the control member.

Preferably, the management method comprises a step which consists in checking the availability of the second electrical power supply prior to the power supply switchover.

BRIEF DESCRIPTION OF THE DRAWINGS

Other features and advantages will emerge from the following description of the disclosure, given purely as an example, in light of the attached drawings in which.

DETAILED DESCRIPTION

Figure 1:
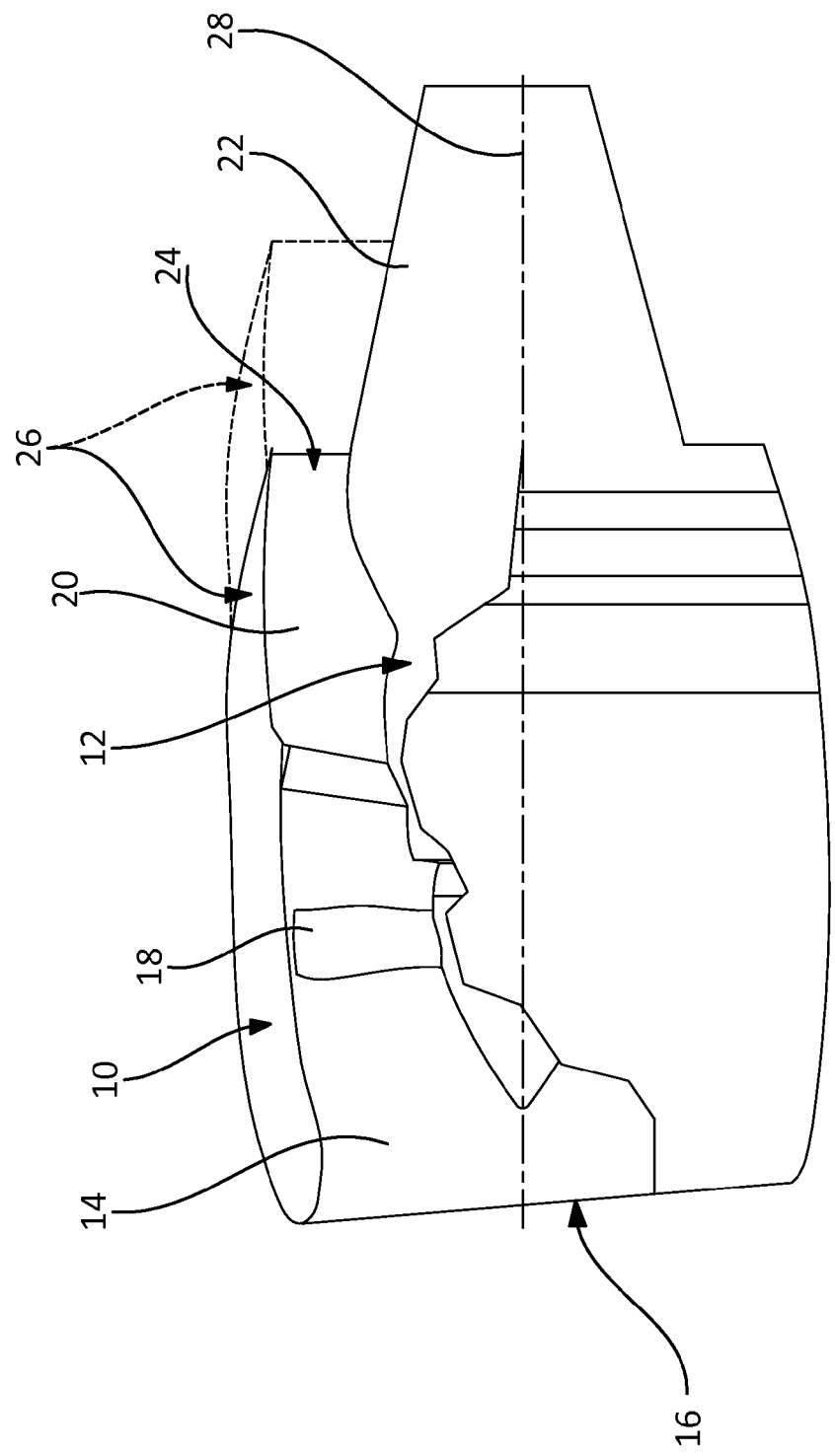
FIG. 1 is a side view of a propulsive assembly of an aircraft with a partial cutaway making it possible to schematically show a jet pipe nozzle with variable cross-section.
Figure 2:
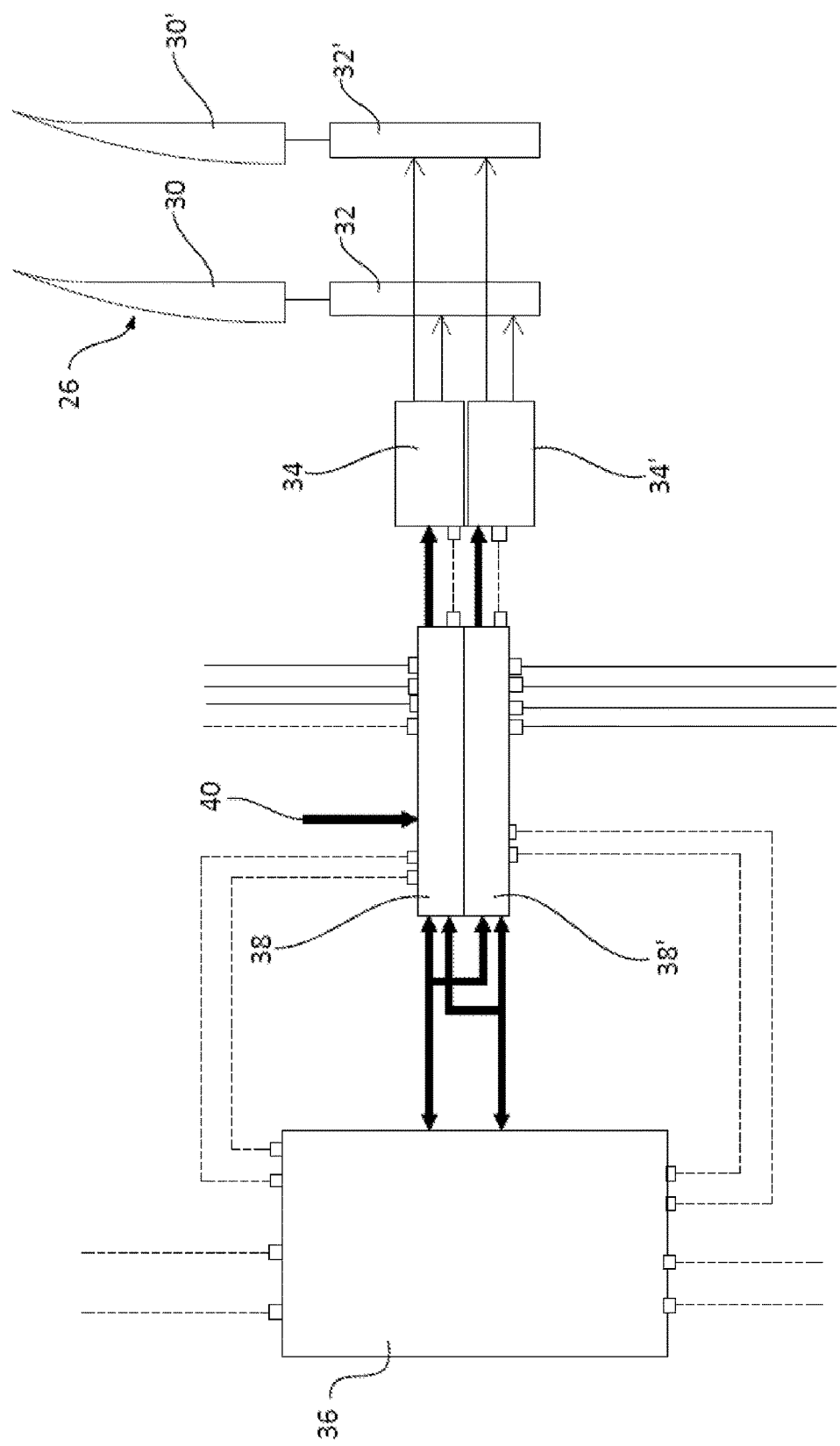
FIG. 2 is a schematic representation of a control architecture for a jet pipe nozzle with variable cross-section according to the prior art.
Figure 3:
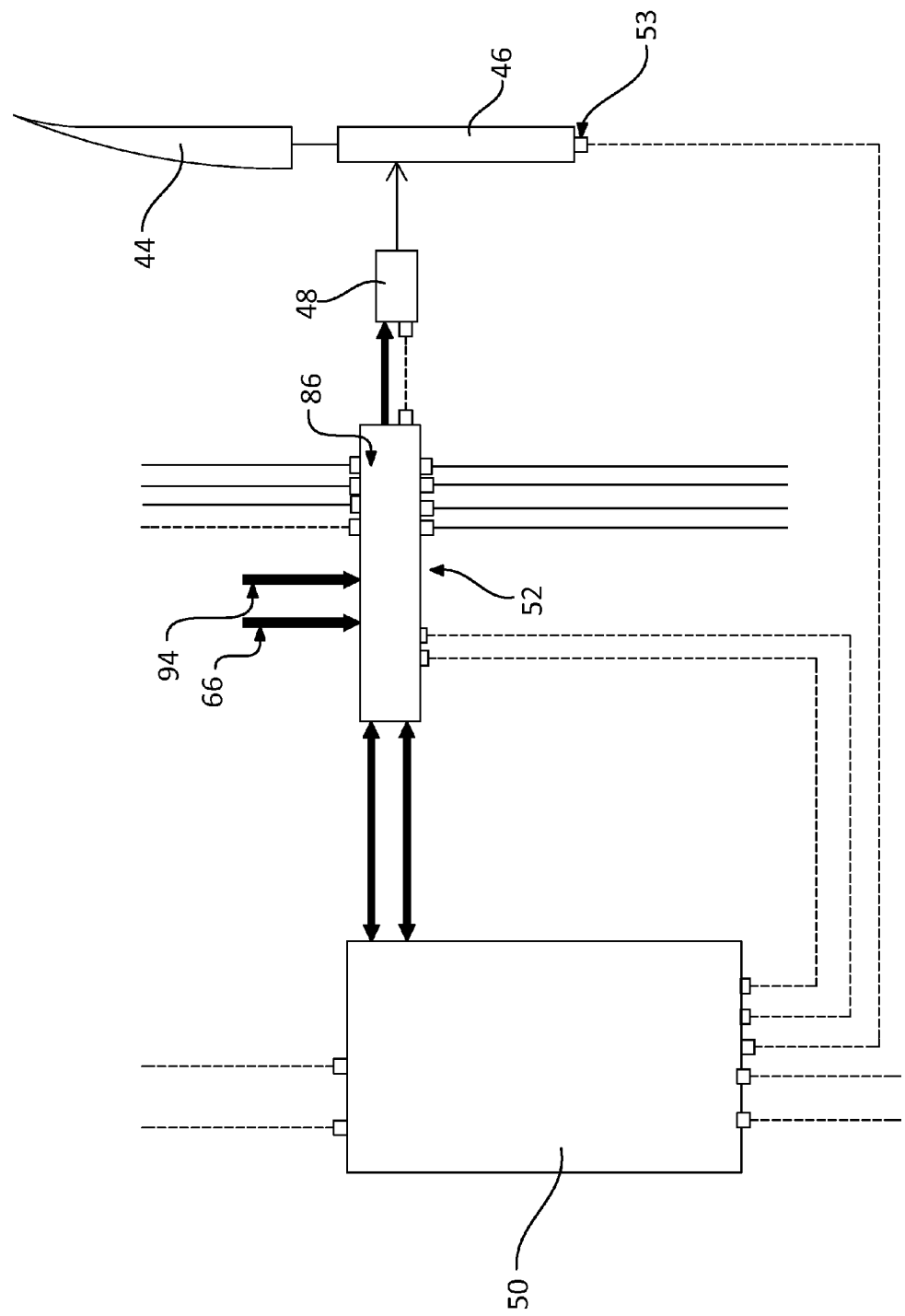
FIG. 3 is a schematic representation of a control architecture for a jet pipe nozzle with variable cross-section according to a variant which illustrates the disclosure.

A jet pipe nozzle with variable cross-section comprises at least one moving part 44 linked via a mechanical transmission chain 46 to an actuator 48 such as a motor, as schematically illustrated in FIG. 3.

Preferably, each jet pipe nozzle comprises two moving parts 44, advantageously substantially symmetrical relative to a vertical median plane of the jet pipe nozzle, and two actuators 48, one for each moving part. Whatever the variant, the jet pipe nozzle with variable cross-section comprises at least one moving part 44 and at least one actuator 48.

Purely as an example, the jet pipe nozzle with variable cross-section and the mechanical transmission chain can be identical to those described in the document EP-779.429. However, the disclosure is not limited to this embodiment of the jet pipe nozzle with variable cross-section, or to this mechanical transmission chain.

To ensure the control of the jet pipe nozzle with variable cross-section, the aircraft comprises a regulation system 50 for the motor drive, also called FADEC, and a control member 52, also called PE, making it possible to supply electrical energy and control an actuator 48.

Whatever the configuration, a jet pipe nozzle with variable cross-section comprises at least one control device which provokes and controls the movements of the moving part or parts 44 of the jet pipe nozzle with variable cross-section. This control device comprises at least one regulation system 50, at least one control member 52 and at least one actuator 48.

In addition, the control device can comprise, for each moving part, a sensor 53 which controls and/or measures the real displacement of the moving part or parts and informs the regulation system 50 and/or the control member 52. According to one embodiment, each sensor 53 is an incremental angular sensor of RVDT (Rotary Variable Differential Transformer) type securely attached to a mechanical transmission for each moving part.

Figure 4:
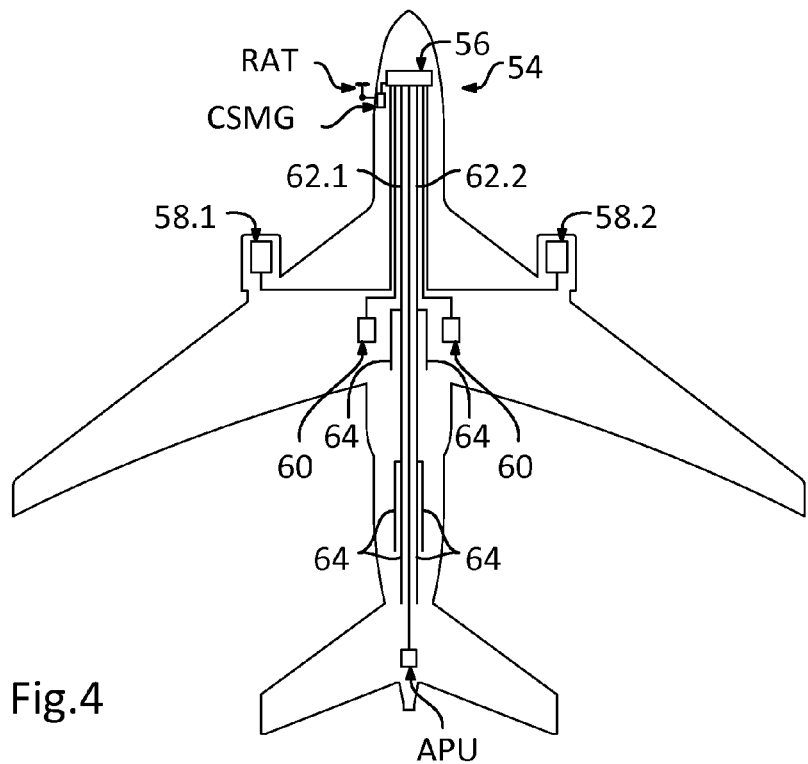
FIG. 4 is a schematic representation of the different electrical sources of an aircraft.

As illustrated in FIG. 4, an aircraft 54 comprises an electrical and electronics compartment 56 in which are positioned some of the electrical and/or electronic equipment items of the aircraft, such as, for example, the electric cores. The aircraft comprises a number of independent electrical energy sources which are:

at least one left motor generator 58.1 provided in each motor drive of the left wing and linked to a first electrical core, at least one right motor generator 58.2 provided in each motor drive of the right wing and linked to a second electrical core, an auxiliary power unit called APU generator, which is generally placed at the rear of the aircraft, a generator, called CSMG (Constant Speed Motor Generator) which produces electricity from the hydraulic pressure of a hydraulic circuit, the pressure preferably being generated by an emergency wind turbine, called RAT (Ram Air Turbine) generator, at least one electrical energy accumulator such as, for example, batteries 60.

To route the electrical energy to its various equipment items, the aircraft 54 comprises two main electrical power supply busbars 62.1 and 62.2, a first main electrical power supply busbar 62.1 powered by a first right motor generator 58.1 and a second main electrical power supply busbar 62.2 powered by a second left motor generator 58.2. Also, the two main electrical power supply busbars 62.1 and 62.2 are considered as independent electrical power supplies.

Each main electrical power supply busbar 62.1 and 62.2 supplies a number of electrical power supply sub-bars 64 which each power at least one airplane electrical power supply. Thus, a control device for a jet pipe nozzle with variable cross-section is powered by an airplane electrical power supply 66. Typically, the airplane electrical power supply is of three-phase type, with three phases P1, P2 and P3 (visible in FIGS. 6A to 6C), with 115 V alternating current with a frequency of 400 Hz.

According to one embodiment, the actuator 48 is an electric motor 68 configured to directly use the airplane electrical power supply 66 as a three-phase electric motor operating with 115 V and 400 Hz alternating current.

Figure 6A:
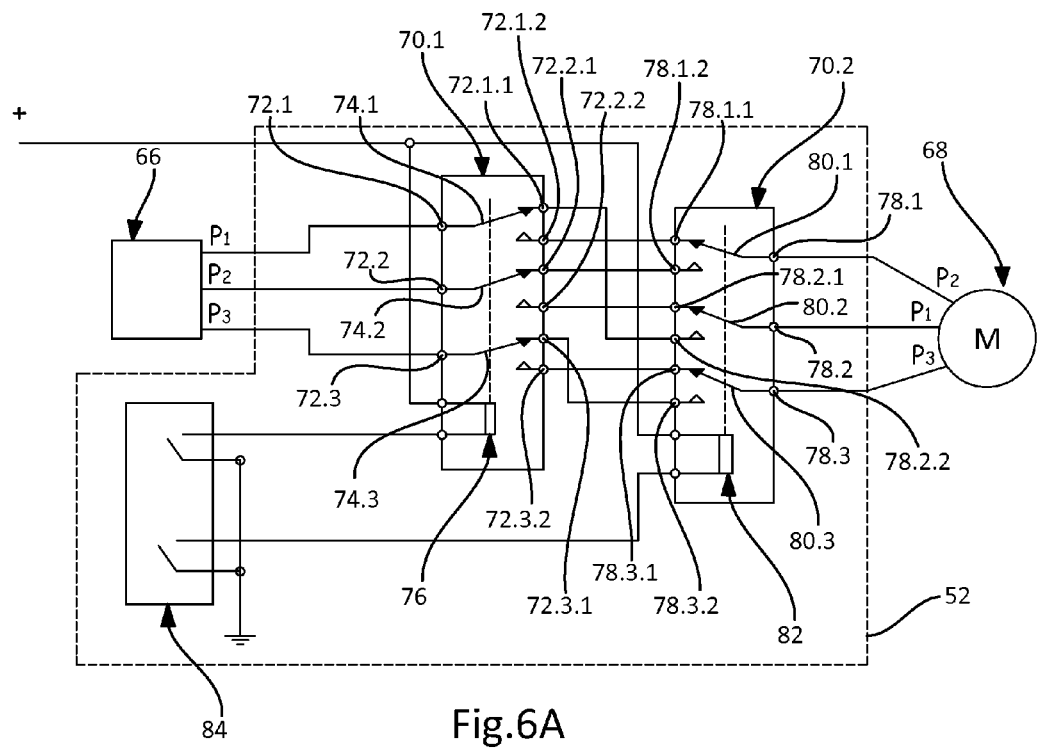
FIGS. 6A to 6C are diagrams illustrating a control member according to an embodiment, respectively in the inactive state, upon deployment, and upon the retraction of a moving part of a jet pipe nozzle with variable cross-section.
Figure 6B:
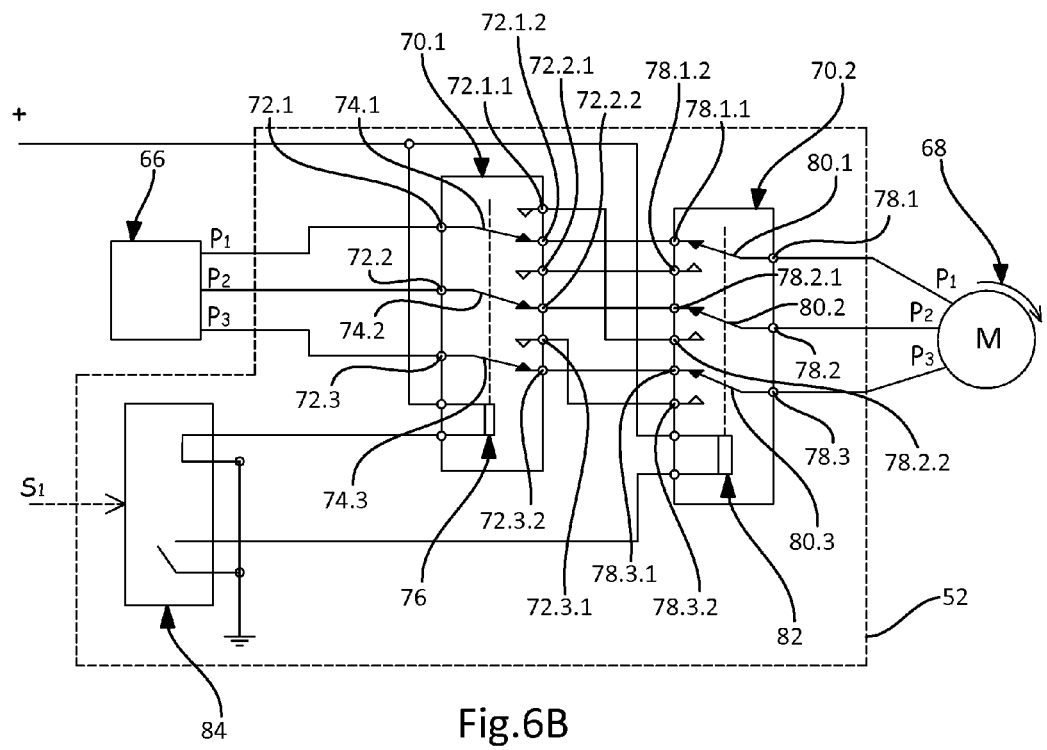
Figure 6C:
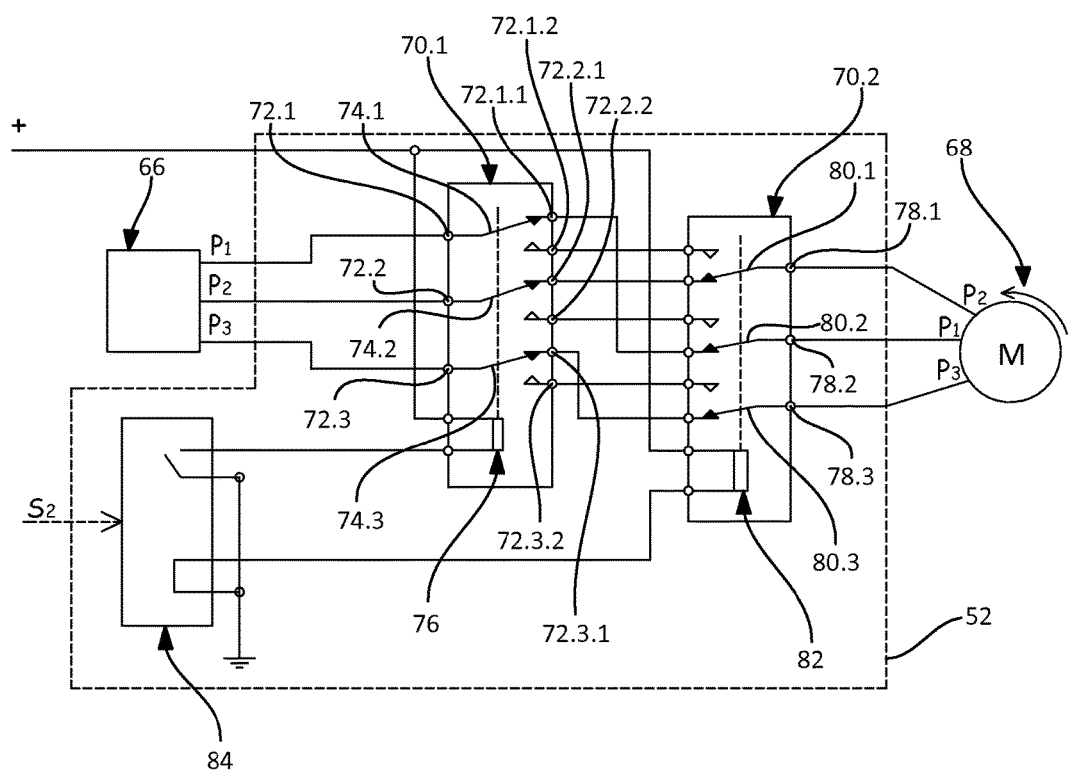

According to this design, the reversal of the direction of rotation of the electric motor 68 derives from the reversal of phases, notably of the phases P1 and P2, at the poles of the electric motor 48 as illustrated in FIGS. 6B and 6C.

According to one embodiment, the actuator 48 is a three-phase asynchronous motor.

In parallel, a control member 52 comprises an output delivering a three-phase electrical power supply suitable for the actuator and means for switching over the phases of the airplane electrical power supply 66 in order to modify the direction of rotation of the electric motor 68. These means for switching over the phases are of analogue type.

According to an embodiment illustrated in FIGS. 6A to 6C, the control member 52 comprises at least two electrical relays 70.1 and 70.2 arranged in series, the outputs of the first relay 70.1 being linked to the inputs of the second relay 70.2 so as to allow for the switching over of the phases P1 and P2, one of them 70.1 controlled by a signal S1 making it possible to rotate the electric motor in a first direction, as illustrated in FIG. 6B, the other 70.2 controlled by a signal S2 making it possible to rotate the electric motor in a second direction (the reverse of the first), as illustrated in FIG. 6C.

In the absence of a signal, the two relays 70.1 and 70.2 are in the rest state and the electric motor 68 is not powered.

According to one embodiment, the first relay 70.1 comprises three inputs 72.1, 72.2 and 72.3 and six outputs 72.1.1, 72.1.2, 72.2.1, 72.2.2, 72.3.1, 72.3.2.

The first relay 70.1 comprises three contactors 74.1, 74.2, 74.3, one for each input, likely to occupy two states (rest and switched). The three contactors are controlled simultaneously by a control 76. In the absence of a signal, the three contactors are in the rest state, as illustrated in FIG. 6A, and link the inputs 72.1, 72.2, 72.3 with the outputs 72.1.1, 72.2.1, 72.3.1 respectively. When the control 76 receives a signal S1, it switches the three contactors to the switched state, as illustrated in FIG. 6B, linking the inputs 72.1, 72.2, 72.3 respectively with the outputs 72.1.2, 72.2.2, 72.3.2.

The inputs 72.1, 72.2, 72.3 are linked respectively with the phases P1, P2, P3 of the electrical power supply 66.

The second relay 70.2 comprises six inputs 78.1.1, 78.1.2, 78.2.1, 78.2.2, 78.3.1, 78.3.2 and three outputs 78.1, 78.2, 78.3.

The second relay 70.2 comprises three contactors 80.1, 80.2, 80.3, one for each output, likely to occupy two states (rest and switched). The three contactors are controlled simultaneously by a control 82. In the absence of a signal, the three contactors are in the rest state, as illustrated in FIG. 6A, and link the inputs 78.1.1, 78.2.1, 78.3.1 with the outputs 78.1, 78.2, 78.3 respectively. When the control 82 receives a signal S2, it switches the three contactors to the switched state, as illustrated in FIG. 6C, linking the inputs 78.1.2, 78.2.2, 78.3.2 with the outputs 78.1, 78.2, 78.3 respectively.

The outputs 78.1, 78.2, 78.3 are linked to the poles of the electric motor 68.

Between the two relays 70.1 and 70.2, the outputs 72.1.1, 72.1.2, 72.2.1, 72.2.2, 72.3.1, 73.3.2 of the first relay 70.1 are linked to the inputs 78.2.2, 78.1.1, 78.1.2, 78.2.1, 78.3.2, 78.3.1 respectively.

According to the example illustrated in FIGS. 6A to 6C, in the absence of a signal, the electric motor does not operate, on receipt of a signal S1 it rotates in a first direction, on receipt of a signal S2 it rotates in a second direction.

According to a first variant illustrated in FIGS. 6A to 6C, the signals S1 and S2 emitted by the regulation system 50 via a communication bus are converted by a contactor box 84, each of the contactors independently allowing the passage or not of the electric current likely to excite one or other of the relays.

The contactor box 84 comprises as many contactors as there are signals to be converted as well as electronic means making it possible to close the appropriate contactor according to the signal received. According to this embodiment, one of the terminals of each contactor is linked to the ground, the other terminal of a first contactor being linked to the control of a first relay, the other terminal of the second contactor being linked to the control of the second relay.

The disclosure is not limited to this embodiment of the control member 52. Other solutions can be envisaged such as those described in the Patent Application FR-1354199.

Whatever the variant, the control member 52 comprises a set 86 of electrical power contactors.

Figure 5:
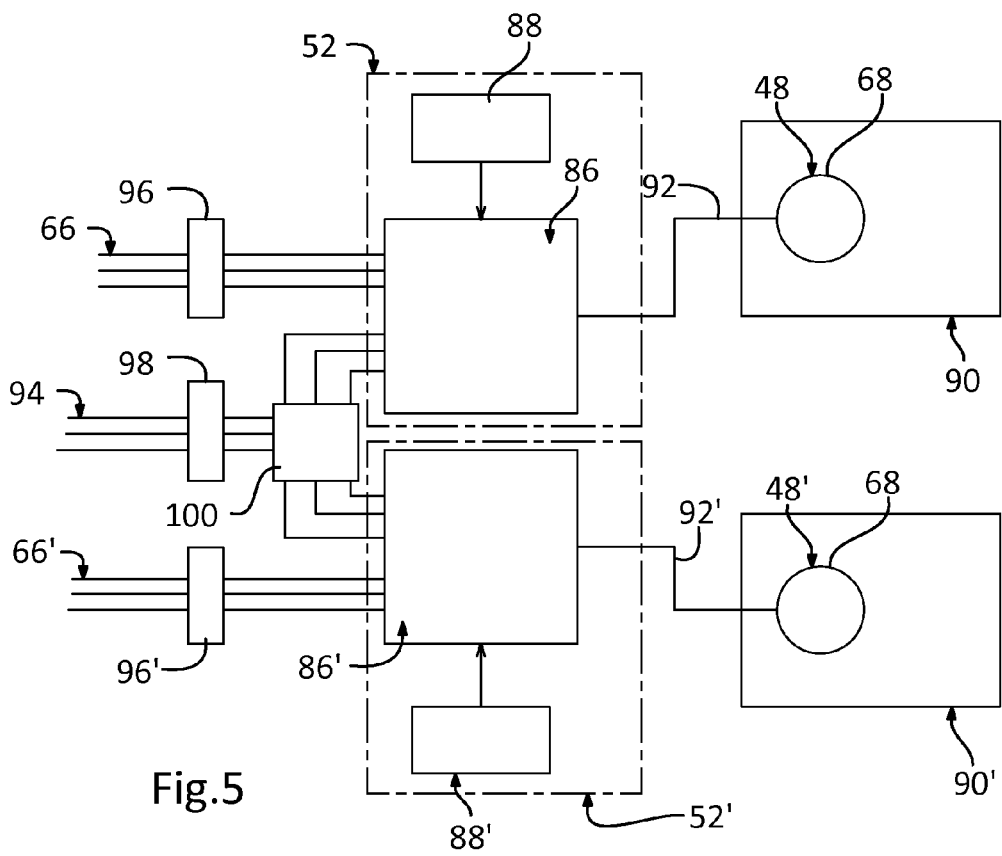
FIG. 5 is a schematic representation of the architecture of an electrical power supply of a control device for a jet pipe nozzle with variable cross-section.

According to an embodiment illustrated in FIG. 5, these electrical power contactors are controlled by a control 88 such as, for example, a computer. This set 86 of electrical power contactors is located on a printed circuit allowing for the insertion of wiring and contactors.

Advantageously, the control member 52 comprises a solid-state converter upstream of the set of electrical power contactors, which is not located on the same printed circuit as the electrical power contactors.

According to an embodiment illustrated in FIG. 5, an aircraft comprises two actuators 48, 48' (one for each jet pipe nozzle) each making it possible to vary the variable cross-section of a jet pipe nozzle with variable cross-section 90, 90', each actuator 48, 48' being linked by a control and electrical power supply line 92, 92' to a control member 52, 52' controlled by a control 88, 88'.

Whatever the variant, the aircraft comprises at least one control member 52 which can control one or more actuators 48, 48'. Thus, each actuator 48, 48' can be controlled by a single control member 52 or by two control members 52 so as to obtain a redundant system.

Preferably, each control member 52 outputs a three-phase electrical power supply routed by the control and electrical power supply line 92, 92' to an actuator 48, 48'.

According to one feature of the disclosure, a control member 52 is connected to two independent electrical power supplies, a first airplane electrical power supply 66 and a second electrical power supply 94 independent of the first airplane electrical power supply 66.

Preferably, the control member 52 is powered by a motor generator and by a second electrical power supply 94 independent of the motor generators.

Advantageously, the control member 52 comprises an internal architecture which should make it possible to guarantee the requisite level of operational availability of the electrical power supply while minimizing the risks of a lack of isolation of the two independent electrical power supplies. To this end, the control member 52 comprises a set of contactors with a high level of reliability making it possible to prevent any contact between the two electrical power supplies 66 and 94 electrically and mechanically. Furthermore, the electrical architecture of the control member 52 comprises redundant protections to guarantee that a situation in which one or more contactors might bring the two power supplies 66 and 94 into contact is the result of highly improbable failures. To this end, the control member 52 comprises two-state three-phase solid-state contactors, one of the two states being the to be stable, and controlled by a set of electrical sensors capable of detecting an operation fault.

Advantageously, a control member 52, 52' comprises a first part making it possible to control and power at least one actuator 48 and a second part making it possible to alternately connect with the first airplane electrical power supply 66 or with the second electrical power supply 94.

The two parts can be positioned in a same area of the aircraft or in two different areas, the first part in the nacelle and the second part in the fuselage, for example in the electrical and electronics compartment of the aircraft.

According to an embodiment illustrated in FIG. 5, two control members 52, 52' are powered by different airplane electrical power supplies 66, 66'. Thus, the control device comprises, in a first propulsive assembly, a first control member 52 dedicated to the control of a first jet pipe nozzle with variable cross-section and powered by a first airplane electrical power supply 66 linked indirectly to the left (respectively right) motor generator and a second control member 52' dedicated to the control of a second jet pipe nozzle with variable cross-section and powered by a second airplane electrical power supply 66' linked indirectly to the right (respectively left) motor generator.

Preferably, the control members 52, 52' are powered by the same second electrical power supply 94.

According to another feature of the disclosure, a circuit breaker 96, 98 is provided to isolate each independent electrical power supply 66 and 94 from each control member 52 or 52'.

Thus, as illustrated in FIG. 5, a circuit breaker 96 is provided to isolate the first airplane electrical power supply 66 from the first control member 52 and a circuit breaker 98 is provided to isolate the second electrical power supply 94 from the first control member 52. This circuit breaker 98 makes it possible to isolate the second electrical power supply 94 from the second control member 52'.

A circuit breaker 96' is provided to isolate the second airplane electrical power supply 66' from the second control member 52'.

Preferably, at least the second part ensuring the alternate connection of each control member 52, 52' is positioned on the fuselage and the control and electrical power supply line 92, 92' runs in the wing to the actuator 48, 48' controlled by the control member 52, 52'.

Advantageously, a bypass box 100 is inserted between the second electrical power supply 94 and the control members 52, 52'. As illustrated in FIG. 5, the bypass box 100 comprises a single input and as many outputs as there are control members 52, 52'.

This configuration makes it possible to avoid a costly modification of the wing. According to another advantage, the disclosure makes it possible to install in a generator dedicated to the control device in the environment of the jet pipe nozzle with variable cross-section.

According to a first embodiment, the second electrical power supply 94 is connected to the CSMG generator.

This solution provides a high level of availability and makes it possible to be able to control the jet pipe nozzle with variable cross-section even if the opposite motor drive is no longer operating and, consequently, the associated motor generator is no longer delivering electricity.

According to this solution, the second electrical power supply is available only when the aircraft is in an extreme, so-called "electrical emergency" condition. In this circumstance, the motor generators are inoperative. Initially, the electricity supplied by the CSMG generator mainly powers the control device for the jet pipe nozzle with variable cross-section, the other systems of the aircraft being powered according to a minimalistic regime, the onboard instruments being on standby. On completion of the modification of the cross-section of the jet pipe nozzle with variable cross-section, the electricity supplied by the CSMG generators is dedicated to the other functions of the aircraft and in particular to the onboard instruments.

According to this solution, the control member 52, 52' comprises a logic making it possible to authorize the electrical power supply by the CSMG generator only when the following conditions are met:
  the first airplane electrical power supply 66 is not powering the control member 52,
  the CSMG generator is ready to supply electrical power,
  the CSMG generator is authorized by a logic internal to the control of the electrical power supply of the aircraft to supply the power supply to the control device for the jet pipe nozzle with variable cross-section,
  an electrical power supply demand originates from the control device for the jet pipe nozzle with variable cross-section,
  the motor drive of the aircraft opposite the motor drive equipped with the jet pipe nozzle with variable cross-section is inoperative, the jet pipe nozzle with variable cross-section which demands the power supply is not already substantially open, the control 88 allows the engaging of the contactor or contactors linked to the CSMG generator.

According to a second embodiment, the second electrical power supply 94 is connected to the auxiliary power unit APU.

This solution provides a high level of availability and makes it possible to be able to control the jet pipe nozzle with variable cross-section even if the opposite motor drive is no longer operating and consequently the associated motor generator is no longer delivering electricity.

According to this solution, and according to flight scenarios and the level of availability necessary for the propulsive assemblies, the auxiliary power unit APU may then be necessary to the flying of the aircraft (for example for flights of ETOPS type). Consequently, before each take-off, it may be necessary to check that the auxiliary power unit APU is operating correctly and its capacity to start up in all circumstances during the flight of the aircraft.

As is known, a start up button is provided in the cockpit to start up the auxiliary power unit APU.

According to this solution, the control member 52, 52' comprises a logic making it possible to allow the electrical power supply by the auxiliary power unit APU only when the following conditions are met:

the first airplane electrical power supply 66, 66' is no longer powering the control device for the jet pipe nozzle with variable cross-section, the auxiliary power unit APU has finished starting up and the start up button for the auxiliary power unit APU is no longer depressed, the auxiliary power unit APU is capable of supplying a three-phase electrical power supply, an electrical power supply demand originates from the control device for the jet pipe nozzle with variable cross-section, the control member 52, 52' allows the engaging of the contactor or contactors linked to the auxiliary power unit APU.

According to a third embodiment, the second electrical power supply 94 is connected to at least one electrical energy accumulator 60.

According to this variant, the control device comprises a converter inserted between the electrical energy accumulator or accumulators 60 and the control member 52, 52' to convert the direct current delivered by the electrical energy accumulator(s) 60 into a three-phase electric current. According to one embodiment, this converter can be incorporated in a control member 52, 52'.

This solution provides a high level of availability and makes it possible to be able to control the jet pipe nozzle with variable cross-section even if the opposite motor drive is no longer operating and consequently the associated motor generator is no longer delivering electricity.

The electrical energy accumulator(s) 60 also deliver the electrical power necessary to start up the auxiliary power unit APU. As is known, a start up button is provided in the cockpit to start up the auxiliary power unit APU.

Given the capacity of the electrical energy accumulator(s) 60, the starting up of the auxiliary power unit APU can not be triggered concomitantly with the electrical power supply of the control device for the jet pipe nozzle with variable cross-section by the electrical energy accumulator(s) 60.

According to this solution, the control member 52, 52' comprises a logic making it possible to allow the electrical power supply by at least one electrical energy accumulator 60 only when the following conditions are met:

the first airplane electrical power supply 66, 66' is no longer powering the control device for the jet pipe nozzle with variable cross-section, the start up of the auxiliary power unit APU is not demanded or its start up button is not depressed or held in the depressed position, an electrical power supply demand originates from the control device for the jet pipe nozzle with variable cross-section, the control member 52, 52' allows the engaging of the contactor or contactors linked to the electrical energy accumulator 60 or to the electrical energy accumulators 60.

The disclosure also proposes a method for managing the electrical power supply of the control device for a jet pipe nozzle with variable cross-section which consists in powering the control member 52, 52' with the second electrical power supply 94 when the first airplane electrical power supply 66 has failed and is no longer powering the control member 52, 52'. Preferably, the management method comprises a step which consists in checking the availability of the second electrical power supply 94 prior to the power supply switchover.

The invention claimed is:

1. An aircraft comprising
one or more jet pipe nozzles, each of the one or more met pipe nozzles having a variable cross-section,
at least one left motor generator,
at least one right motor generator,
a control device for the one or more jet pipe nozzles of the aircraft, the control device comprising
at least one control member, which drives at least one actuator, which generates, via a mechanical transmission chain, a movement of at least one moving part of the one or more jet pipe nozzles with variable cross-section,
wherein the control member is powered by a first airplane electrical power supply linked to at least one of the at least one right motor generator or the at least one left motor generator, and
wherein the control member is powered by a second airplane electrical power supply linked to an electrical power source of the aircraft that is independent of the first airplane electrical power supply.

2. The aircraft according to claim 1, wherein the control member is powered by a motor generator and by a second electrical power supply independent of the motor generators.

3. The aircraft according to claim 1, wherein the second electrical power supply is linked to a constant speed motor generator (CSMG) of the aircraft.

4. The aircraft according to claim 1, wherein the second electrical power supply is linked to an auxiliary power unit (APU) of the aircraft.

5. The aircraft according to claim 1, wherein the second electrical power supply is linked to at least one electrical energy accumulator of the aircraft.

6. The aircraft according to claim 1, wherein the control member comprises a first part to control and power at least one actuator and a second part to alternately connect with the first airplane electrical power supply or with the second airplane electrical power supply.

7. The aircraft according to claim 6, wherein at least the second part of the control member is positioned in the fuselage of the aircraft.

8. The control device according to claim 1, wherein the control member comprises a set of electrical power contactors to prevent contact between the two electrical power supplies electrically and mechanically.

9. The control device according to claim 1, comprising, in a first propulsive assembly, a first control member dedicated to control of a first of the one or more jet pipe nozzles with variable cross-section and powered by the first airplane electrical power supply linked indirectly to the left motor generator and, in a second propulsive assembly, a second control member dedicated to control of a second of the one or more jet pipe nozzles with variable cross-section and powered by the second airplane electrical power supply linked indirectly to the right motor generator.

10. The control device according to claim 9, wherein the two control members are powered by the second airplane electrical power supply.

11. The control device according to claim 9, comprising a bypass box with a first input, which is linked to the second electrical power supply, and a plurality of outputs, each of which is linked to a control member.

12. The control device according to claim 9, comprising, for each electrical power supply a circuit breaker to isolate the electrical power supply from the control member.

13. The control device according to claim 1, comprising, in a first propulsive assembly, a first control member dedicated to control of a first of the one or more jet pipe nozzles with variable cross-section and powered by the first airplane electrical power supply linked indirectly to the right motor generator and, in a second propulsive assembly, a second control member dedicated to control of a second of the one or more jet pipe nozzles with variable cross-section and powered by the second airplane electrical power supply linked indirectly to the left motor generator.

14. A method for managing the electrical power supply of a control device for a jet pipe nozzle with variable cross-section of an aircraft, the aircraft comprising one or more jet pipe nozzles, each of which have a variable cross-section, the device comprising at least one control member which drives at least one actuator which generates, via a mechanical transmission chain, a movement of at least one moving part of the jet pipe nozzle with variable cross-section, the control member being powered by a first airplane electrical power supply linked to at least one right or left motor generator of the aircraft, wherein the method comprises powering the control member by a second electrical power supply linked to an electrical power source of the aircraft independent of the first airplane electrical power supply when the first airplane electrical power supply no longer powers the control member.

15. The method according to claim 14, comprising checking the availability of the second electrical power supply prior to the power supply switchover.

* * * * *